United States Patent

[11] 3,598,940

| [72] | Inventors | Anderson B. Smedley<br>1191 Morada Place, Altadena, Calif. 91001;<br>Paul A. Smedley, 3786 Canfield Road, Pasadena, Calif. 91107 |
|---|---|---|
| [21] | Appl. No. | 831,514 |
| [22] | Filed | June 9, 1969 |
| [45] | Patented | Aug. 10, 1971 |

[54] ISOLATOR SWITCH
23 Claims, 13 Drawing Figs.

| [52] | U.S. Cl. | 200/48 |
|---|---|---|
| [51] | Int. Cl. | H01h 31/00 |
| [50] | Field of Search | 200/48, 166 H, 163 |

[56] References Cited

UNITED STATES PATENTS

| 1,595,804 | 8/1926 | Miller | 200/48 |
|---|---|---|---|
| 2,244,201 | 6/1941 | Johnson | 200/48 |
| 2,420,485 | 5/1947 | Kast | 200/48 |
| 3,206,568 | 9/1965 | Foti | 200/48 |
| 3,320,376 | 5/1967 | Caldwell et al. | 200/48 |

*Primary Examiner*—Robert K. Schaefer
*Assistant Examiner*—H. J. Hohauser
*Attorney*—Angus and Mon ABSTRACT: An isolator switch for high voltage transmission lines and switch yards. A switchblade is rotatably mounted to a bearing which bearing is rotatable around a central axis. The switchblade can be swung in a plane normal to the central axis independently around the bearing, and also around the central axis by rotation of the bearing around the central axis. A contact member is spaced from the central axis, and exposes a contact surface to the switchblade. A circuit is completed by the combined motions of turning the switchblade around the bearing and turning the bearing around the central axis, so as to move the switchblade against the contact surface in an abutting relationship which may be either compressive or sliding, there being a substantial longitudinal movement of the tip of the switchblade along the line joining the contact surface and the central axis, this being a toggle-type motion. Preferably the contact surface is inside a cavity whose walls will restrain the tip of the blade from lateral disengagement after the contact is made. The contact member and also the switchblade may be mounted to a column which permits deflection in response to force exerted between them, and which also renders the conductive portion of the switch nonresponsive to earthquake motion. According to a preferred embodiment, the device is provided with a pair of such switchblades whose angular positions relative to the central axis are angularly coordinated.

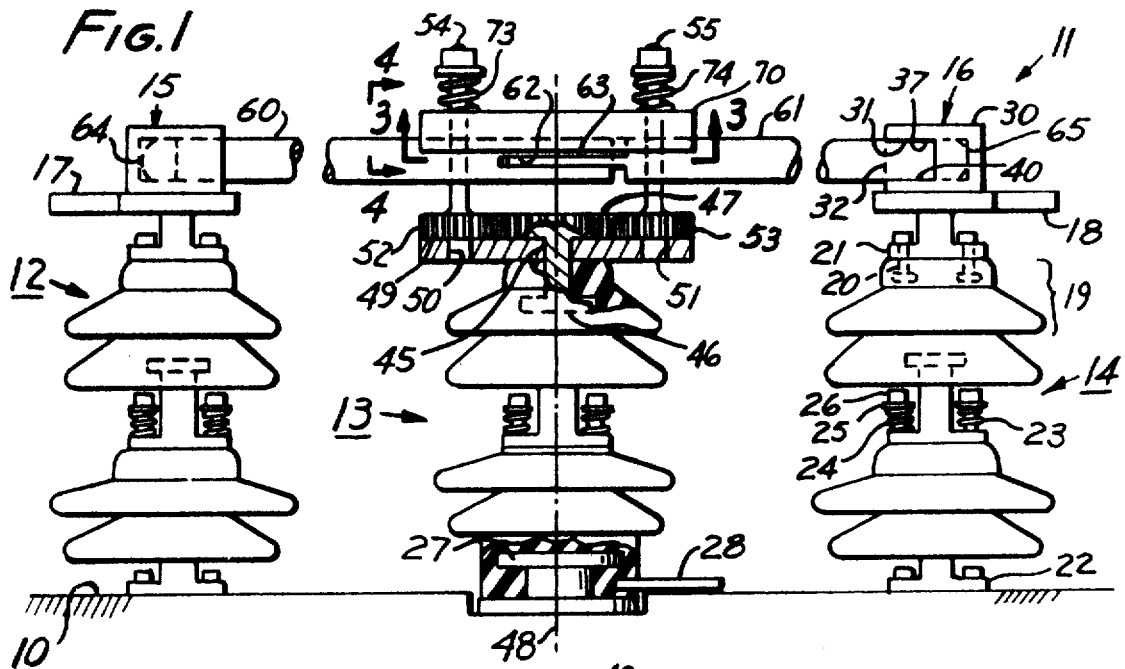
FIG.1
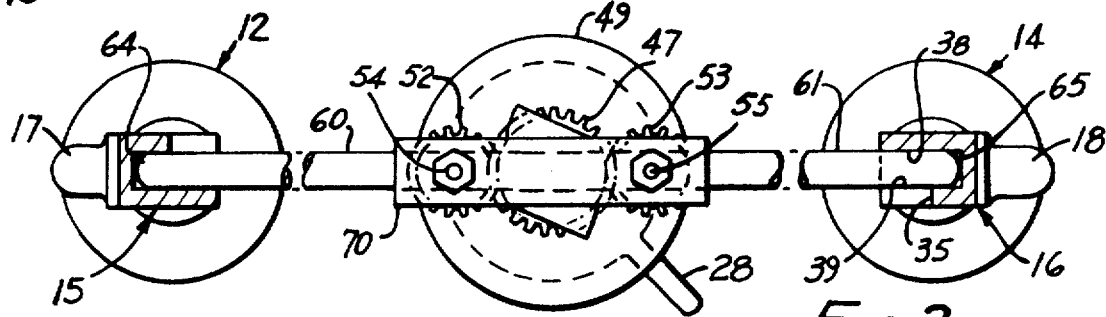
FIG.2
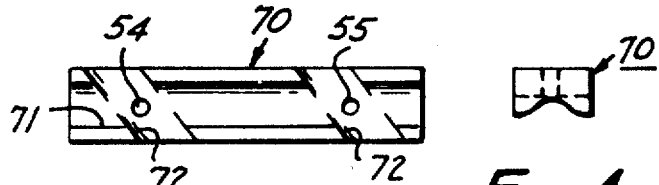
FIG.3
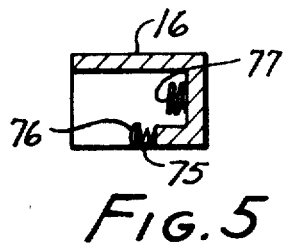
FIG.4
FIG.5
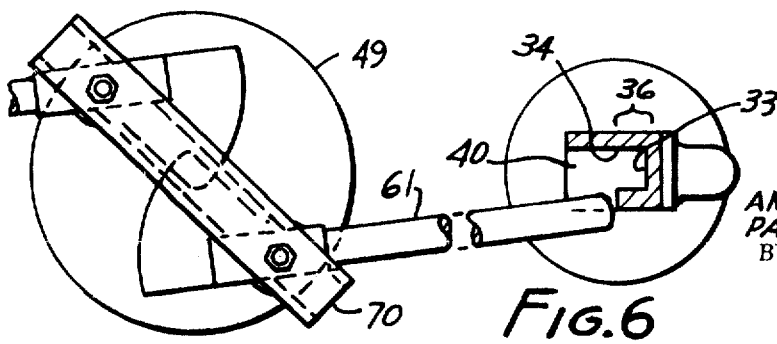
FIG.6
INVENTOR.
ANDERSON B. SMEDLEY,
PAUL A. SMEDLEY
BY
ATTORNEYS.

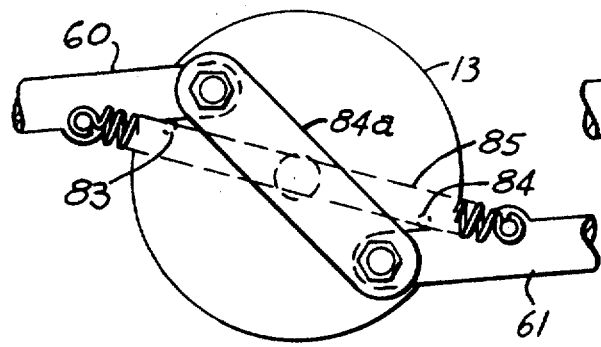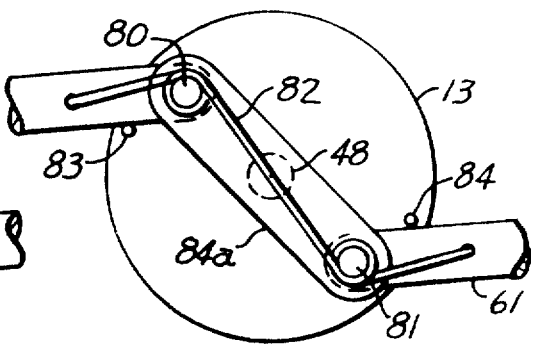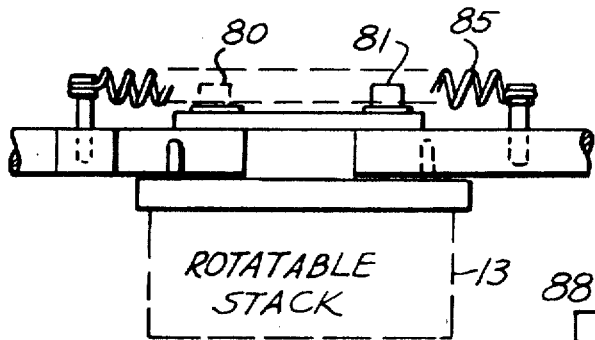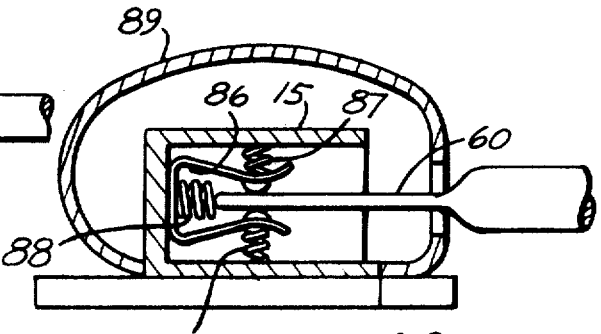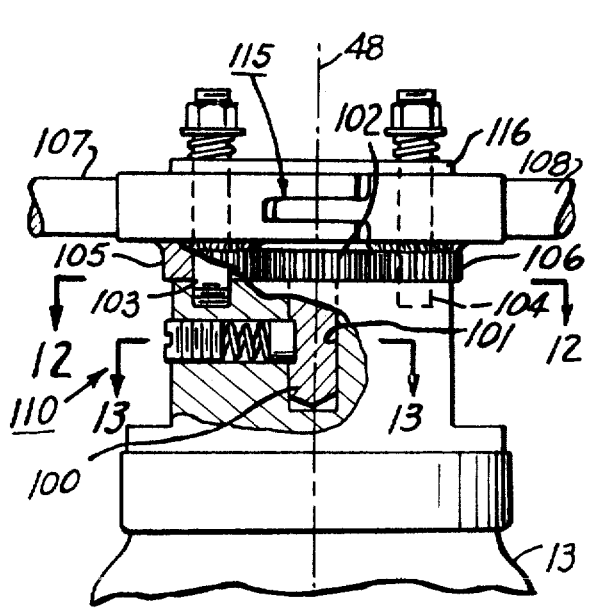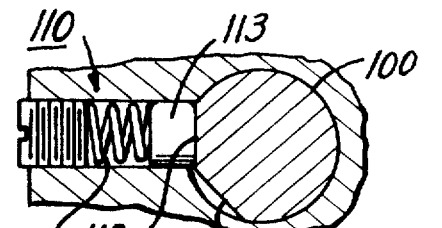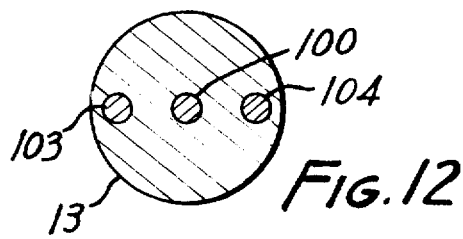
INVENTOR.
ANDERSON B SMEDLEY,
PAUL A. SMEDLEY
BY
ATTORNEYS.

ISOLATOR SWITCH

This invention relates to isolator switches for use with electrical transmission equipment.

Isolator switches are customarily used with transmission lines and in switch yards in high voltage applications. They are not ordinarily intended to open under load, and are designed to provide a substantial air break for isolating some part of a system from the line.

There are very considerable problems involved in the design of isolator switches. For one, they must be extremely reliable, and although they are rather infrequently used, they must unquestionably be readily opened on demand. While closure is not as critical, this function, too, should be highly reliable. However, the switch is open when something needs to be done in the system, and the inability to open the switch for any reason could be a critical failing.

Also, in the event of unpredictable events such as earthquakes, their condition of being open or closed must be stable. A constant concern in the use of presently known isolator switches is the possibility that they will be opened by the random motion caused by earth waves. It is an object of this invention to provide a device which can be proof against disengagement by earthquake motions.

Still another difficulty encountered in the design and operation of isolator switches is the environmental circumstances in which they are used. For example, it is necessary to design these with the anticipation that they will be used and actuated in 100 m.p.h. winds, and have to change from the closed to the open condition when coated with layers of ice in excess of ½ inch thickness. Because such devices often use switchblades whose length is on the order of 6 to 20 feet, deflection caused by such natural events as high winds is potentially troublesome and deleterious to the functioning of the switch. Also, many switches become iced up to the extent that they cannot be opened. It is an object of this invention to provide an isolator switch which is able to overcome the foregoing and other environmental disadvantages, being resistant to high winds and able to crack away and remove any ice which may be present when the switch is opened.

There are still further problems involved in the design and use of isolator switches, especially in the cases of those switches which operate at voltages of the magnitudes between above 34.5 kv. and especially at 500 kv. to 750 kv. and higher voltages. These switches are bulky physical installations, and involve substantial magnetic fields which are derived from the high densities of current and the elevated voltages which they handle. These fields develop mechanical forces, particularly under short circuit conditions, which are very large, and prior art isolator switches have been subject to dislocation and opening under such circumstances, thereby rendering the isolator switch unreliable. It is a further object of this invention to provide a switch which is proof against such disadvantages.

It is still another object of this invention to ease the presently existing stringent design considerations as to alignment of the various parts of the switch by providing a simplified structure which is self-aligning.

An isolator switch according to this invention has a central axis. A switchblade lies and moves in a plane normal to the central axis. It is rotatably mounted to a bearing at a point which is spaced laterally from the central axis, which bearing can rotate around the central axis. The blade can thereby swing in its plane around the bearing and also can be swung in that plane by rotation of the bearing around the central axis.

A contact member has a contact surface which is spaced from the central axis by a distance no greater than the sum of the distances between the central axis and the said point, and between the said point and the contacting part of the blade. The blade and the contact may be placed into abutting (either compressive or sliding), current-carrying relationship by turning the bearing in a crank-type motion so as to insert and then to force the blade into contact with the contact means. Inversely, the large forces derived from the eccentric motion will overcome the resistance of ice and whatever else may be anticipated, and assure the opening of the switch.

According to a preferred but optional feature of the invention, the contact member is provided within a cavity which cavity has a peripheral boundary that restrains the tip of the blade from lateral motion after it is once inserted into the cavity.

According to another preferred but optional feature of the invention, the bounding wall of the cavity is provided with a slot for permitting lateral entry of the blade into the cavity.

According to still another preferred but optional feature of the invention, the contact member and the rotatable shaft are mounted to columns which include a distortable element which accommodates random motions of the base portions of the switch while still leaving the operative portions of the switch stable and isolated from distortive earth waves.

According to still another preferred but optional feature of the invention, the rotatable shaft and the blades are interconnected so as to coordinate the angular positions thereof.

The above and other features of this invention will be fully understood from the following detailed description and the accompanying drawings, in which:

FIG. 1 is a side elevation, partly in cutaway cross section of one embodiment of the invention;

FIG. 2 is a top view of FIG. 1;

FIGS. 3 and 4 are sections taken at lines 3-3 and 4-4, respectively, in FIG. 1;

FIG. 5 is a fragmentary cross section of a portion of FIG. 1 showing a modification thereof;

FIG. 6 is a fragmentary view of FIG. 2 in another operational position;

FIG. 7 is a fragmentary side elevation of a variation of the invention;

FIG. 8 is a fragmentary top view of another embodiment of the variation;

FIG. 9 is a fragmentary top view of FIG. 7;

FIG. 10 is a cross section of an optional portion of the invention;

FIG. 11 is a side elevation, partly in cutaway cross section, of the presently preferred embodiment of the invention; and FIGS. 12 and 13 are cross sections taken at lines 12-12 and 13-13, respectively, of FIG. 11.

With initial reference to FIG. 1, a base 10 is shown which may, for example, be the structural framework of a supporting tower or other structure. An isolator switch 11 according to the invention is attached to this base by any conventional means. The switch includes three columns 12, 13 and 14 for operations and insulative support. Column 13 is the center support, and columns 12 and 14 are for supporting contact members 15, 16 respectively. The columns are stacks of insulators and all are generally similar to column 14 which will be described in detail. Such differences as may exist between the columns will be separately discussed. The contact members are conductive and include means such as tangs 17, 18 for connection to circuitry which it is the purpose of this switch to open or to close.

Column 14 will now be described in greater detail. This column is insulative in nature and constitutes a conventional stack of insulator modules 19. The class of insulator shown in the drawing is a conventional cap-and-pin or station-post type in which the stacks are built up of modules with the larger elements of each module at the top so as to shield the lower ones from rain and dust, and to increase the surface path length along the insulators.

The top of each module includes a stud 20 which rises above it, and it will be seen that the studs of the top module extend through holes in a flange 21, which connects to and supports contact member 16. This is the means whereby the contact member is attached to the insulator stack. At the bottom, a similar flange 22 is attached to the lowermost of the modules, there customarily being a portion (not shown) molded into the lowermost portion of the bottom module by means of which the stack is attached to the base through the flange.

There may be any number of these modules. Usually there are four to six of them, depending on the voltage and the physical characteristics of the installations. Only two are shown, for simplicity in exposition.

An optional feature of this invention, which can provide for resistance to earthquake motion and to an endwise thrust exerted by the switchblades in a manner yet to be described, may be inserted between two of the modules, usually about one-third of the distance up from the bottom of the columns. For this purpose, studs 23 are made somewhat longer than the other studs and pass through coil springs 24 which are compressed and retained by washers 25 backed up by a nut 26. It will now be seen that the modules above this joint can rock angularly relative to the lower ones simply by lateral loading. The angular motion will cock the upper part of the column, and compress the springs on one side. This freedom of motion enables the stack to bend, and will isolate the contact member from earth wave motions. Customarily one or more of these joints will be placed in each of the columns. By dividing the column into two portions and isolating the upper portion from lateral forces exerted on the base, a technique is used which is somewhat similar to that of eliminating cross bracing in the lower floors of tall buildings while cross bracing the upper floors. This enables the base to move in response to earth waves, but leaves the electrically conductive portion substantially isolated in space. If this feature is not desired, the springs are eliminated, and the nuts are applied directly against the respective flanges.

Column 13 differs from the other columns only in the inclusion of a bearing 27 whereby the stack is rendered rotatable by forces exerted on a lever 28 or some other rotational mechanisms such as hydraulic means, or electric motor drives or the like.

The presently preferred embodiment of contact member will now be described, only member 16 being described in detail, member 15 being identical to it. In this embodiment, the contact member comprises a solid conductive body 30 which has a recess 31 therein. The recess has an opening 32 facing toward the central column which exposes a contact surface 33 to the central column. The recess is bounded by a bounding wall 34 which may conveniently comprise the wall of a bore drilled into the member, there preferably being a slot 35 through the bounding wall on one side thereof extending to less depth than the total depth of the recess in order to provide access for the free end of a switchblade yet to be described. When the slot is of such lesser depth, then, within the recess, the bounding wall makes a full peripheral boundary in the axial region 36. A full peripheral boundary is not essential to the invention, but when provided it does supply restraint for the free end of the switchblade against motion in all lateral directions. In the preferred embodiment, the entire axial length of the wall is not continuous around the entire periphery.

It will be noted that the bounding wall includes an upper region 37 as well as side regions 38, 39 and bottom region 40. This construction provides a complete lateral trap for the end of the switchblade when it is fully inserted therein.

A central shaft 45 is keyed into the upper module of column 13 by key 46 so it will rotate therewith. A gear 47 is fixed to shaft 45 and turns with it. Central axis 48 is the axis of rotation of column 13, and of gear 47. It rests upon the top of the insulator stack. A spider plate 49 is freely journaled around shaft 45 so as to be freely rotatable relative thereto. It rests upon the top of the insulator stack. It carries a pair of bearings 50, 51 in which shafts of two satellite gears 52, 53 are journaled. These bearings are parallel to and laterally spaced from the central axis. These satellite gears are both engaged to gear 47 so that when they rotate around their own axes, the spider plate will also rotate around shaft 45, and thereby coordinate the motions of the two satellite gears. Shafts 54 and 55 of the satellite gears are extended upwardly for a purpose yet to be described.

Switchblades 60, 61 are rigidly mounted to satellite gears 52 and 53, respectively, so as to be mounted to the column 13, and are connected to the central shaft 45 through the gears and the spider plate. It will be noted that rotation of the stack will rotate the central gear, and unless there is a torque restraint on the ends of the switchblades, the points of attachment of the switchblades (the bearings) will be rotated around the central axis with the switchblades freely following without rotation in the bearing, for these gears will not turn around gear 47 in the sense of progressive engagement of teeth under such circumstances. Instead, the assembly bodily moves around axis 48 without internal changes.

Torque forces exerted on the switchblades will cause independent rotation of the satellite gears in their respective bearings, which will then cause the spider plate to turn around the central axis. Therefore, there are two classes of rotary movement available to the switchblades. The motion is a crank-type movement of the bearings with independent rotation of the blades available to produce a toggle-type movement.

The switchblades may conveniently be electrically interconnected by a groove 62 on blade 60 and an engaging tongue 63 on blade 61 so that electrical connection will be made between the two switchblades at least when they are aligned. There is advantage in forming the tongue so the contact will not be broken at the center column, even when the switch is open. FIG. 6 shows this condition.

It will be noted that the blades extend laterally toward the contact members and have respective tips 64, 65 adapted to make contact with the contact members. The tips are exemplary of regions of the switchblades intended to make electrical contact.

A retainer 70 is spindled to shafts 54 and 55 so as to be non-rotatable relative to the center column itself. It will turn with the center column. As can best be seen in FIGS. 3 and 4, there are a longitudinal channel 71, and a pair of cross channels 72. These channels provide for two stable switchblade conditions. The first of the conditions utilizes the longitudinal channel, and is shown in FIGS. 1 and 2 where this retainer by virtue of the force exerted by springs 73, 74 is pressed down to hold the switchblades in alignment. This aids in maintaining the switch in the closed condition. The other (open) condition is shown in FIG. 6 wherein the blades are held in cross channels 72. The longitudinal channel intersects the cross channels at shafts 54 and 55.

In order to provide a supplemental torque force, which sometimes may be desired, a modification of contact member 16 can be made as shown in FIG. 5 wherein a spring 75 and cover 76 are disposed where they will exert a dragging force against the tip of the blade when it is moved either into or out of the recess. Furthermore, a supplementary endwise force may be desirable, and for this purpose a springily resilient contactor 77 may be inserted inside the recess. These may be provided in all embodiments.

The foregoing embodiment of the isolator switch provides means for continuous correlation of the angular positions of the switchblades. As shown, the switchblades always remain parallel to each other. This is not a necessary feature of the invention although it is desirable. Other apparatus may be utilized, for example, that shown in FIG. 8 wherein the top of column 13 is shown but without the spider. Instead, two bearings in the form of shafts 80, 81 are molded into the top of the stack to freely journal switchblades 60 and 61. A coil spring 82 wraps around each of the shafts and attaches at its ends to the two switchblades so as to bias them in a counterclockwise direction around their respective shafts. This spring is not used to carry current. It can be insulated from the structure if desired, and also its center portion could be eliminated by anchoring two separate springs to the column. Stop pins 83, 84 limit the rotational motion of the shaft in the counterclockwise direction. Tie bar 84a joins the blades at the shafts and conducts current between them. It will be seen that the centers of shafts 80 and 81 are laterally displaced from and are rotatable around central axis 48. The switchblades are as before rotatable relative to their bearings. The same crank and toggle movements are available.

FIG. 10 shows that the contact surfaces need not be at the end of the switchblade but instead may be at the side, and there are many devices in which sliding rather than compressive contact will be useful and perhaps preferable. Both are species of abutting contacts. Such may occur, for example, when the switch is in a special atmosphere such as $SF_6$. In this embodiment, a C-shaped contact 86 is provided with contact surfaces facing toward the switchblade, and springs 87 load the blades against the side of the switchblade itself. It is this point of contact which is the reference as to motion of the free end of the switchblade in this embodiment. Endwise motion will still be available for breaking ice coatings and the like. If desired, an end contact 88 may additionally be provided which may be springily resilient and compressive in nature. FIG. 10 also indicates that any portion of this device may be surrounded by a corona shield 89. An appropriate slot will be provided to enable the blade to enter the shield.

FIGS. 11—13 show the presently preferred embodiment of the invention. The top of column 13 is shown. The other two columns and their respective contact members are not shown in detail. They may be the same as in any of the other embodiments.

Column 13 is, as before, rotatable around central axis 48. A central shaft 100 is freely rotatable in a bearing 101 in the top of the column, on the central axis. Central gear 102 is pinned to shaft 100. Two bearings (posts) 103, 104, are mounted to the top of the column, and are laterally spaced from the central axis so as to be rotatable around it.

Two satellite gears 105, 106 are freely rotatably journaled to bearings 103, 104, and switch blades 107, 108 are respectively attached to the two satellite gears for rotation around the respective bearings. Gears 105 and 106 are engaged to central gear 102. It follows that the bearings have the same crank-type motion as with other embodiments, and that the switchblades have the same toggle-type effect, and remain parallel to one another.

Detent means 110 comprises a pair of flats 111, 112 on shaft 100, a dog 113 engageable to the flats, and a bias spring 114 to press the dog against the flats. The switchblades are therefore provided with two stable conditions, but with simpler structure than in FIG. 1.

A tongue and groove connection 115 electrically joins the switchblades, and a tie bar 116 may supplement this, as well as tie bearings 103, 104 together so as to resist droop of the switchblades on account of their cantilever mounting.

The operation of the isolator switch will now be described. In FIG. 6, the switch is shown in its just-opening condition. It is possible to turn the center column farther clockwise through an even greater arc so that the switchblades can stand normal to the line between the contact members. However, a system in which a nearly equilateral triangle is formed between the point of attachment of the switchblade to the center column and its tip, between the tip and the contact member, and between the point of attachment and the contact member will ordinarily be preferred for the open setting. This will provide a maximum air break. In rotation to the condition shown in FIG. 6, from that of FIGS. 1 and 2, the switchblades will have been rotated by the gears around the axes of the satellite gears to the position shown. In reaching this position, the tips of the blades will have been axially retracted from the contact member by the crank arm movement of the satellite gears. This toggle-type movement involves great axial force, and is sufficient to crack and break away any encasing ice. The switch can therefore reliably be opened. The same forces are exerted on closing, and are similarly useful in displacing interfering foreign material.

During further clockwise (as seen in FIG. 6) rotation of the center column, there is no torque restraint on the switchblades and there will, therefore, be no rotation of the satellite gears relative to the central gear. Instead, the system will turn as a unit to complete the opening. To close the switch, the operation is reversed. If the additional spring means 75 is provided, a drag will be exerted on the tip of the blade tending to start it rotating around the satellite gear's bearing. If means 75 is not provided, the torque is exerted after the tip passes through the slot and bears against the far wall of the recess. In either event, the tip enters the recess and is restrained there, and further rotation of the center column causes a toggle-like movement to press the tip endwise against the contact member. If desired, the rotation can be carried slightly beyond center to provide a locking action.

Should other contact devices such as that of FIG. 10 be utilized, or even such other alternative devices as tulip-shaped receptacles and other conventionally known devices be used, a similar reaction will occur.

Locking may be exerted by many types of detent. In the closed condition of FIG. 2, the blades are locked by engagement in longitudinal groove 71. When the switch is opened, the lock is snapped upwardly, and snaps down again with the blades in cross grooves 72 in the position of FIG. 6. This is a simple and compact lock. In FIG. 11, the reaction of the dog against the flats creates the same effect.

When endwise force is exerted, with a flexible section placed in the columns 12 and 14 these columns are able to deflect to accommodate themselves for the change in dimension, and the springing will exert a restoring force whereby a strong and reliable contact is made. The endwise springs in FIGS. 5 and 10 also provide such an accommodation, and can do so even if only rigid columns are used. The endwise force is also locking force if the center shaft is turned past center.

The operation of the embodiment of FIG. 11 is the same as that of FIG. 1, but the structure is simpler. The two embodiments serve to illustrate the satellite nature of the bearings which mount the switchblades, so as to achieve the crank and toggle relationship. In FIG. 1, a spider is required, while in FIG. 11, the gears are all mounted to the columns rather than one to the column and the others to a spider.

The operation of the devices of FIGS. 7—9 are similar to the foregoing, except there is no continuous correlation between the angular positions of the blades. Instead they are correlated only by the stop pins. When the tips of the switchblades are engaged in the recesses, a reaction entirely analogous to that in FIG. 1 is secured.

It will be understood that the embodiment shown is a two-blade switch in which current flow is from one contact member through the two blades to the other contact member. It is equally possible to make the switch with only one blade and one contact member thereby forming a single blade switch, utilizing the central shaft as one terminal. This latter class of switch will more often be mounted vertically than horizontally, and will be used for relatively lower voltages. There are considerable advantages in the use of a double-bladed switch device, because arcs are inherently unstable, and in series tend readily to extinguish themselves. Therefore, a double-blade switch will more frequently be used.

It should be noted that the devices of FIGS. 1 and 11 are resistant to winds, because the wind force is compensationally exerted on both sides of a linked system.

Further attention is called to the placement of spring anchorage points in the device of FIG. 9. When the device is on center, the spring is over center, and exerts a locking action.

It will be recognized that less than the entire column 13 may be turned, such as by rotating only an upper portion, or by rotating a shaft to which the various elements are mounted. All of such variants fall within the scope of the invention. However, the arrangement shown has the advantage of simplicity of construction and great reliability.

This invention thereby provides a reliable, inexpensive, rugged, and markedly improved isolator switch for use in switch yards and in transmission line applications, and in other applications where features of this invention are advantageous.

We claim:

1. An isolator switch comprising: a rotatable member having a central axis of rotation; a switchblade, said switchblade lying in a plane normal to said central axis and being rotatably mounted to said rotatable member at a point which is spaced laterally from said central axis, whereby said blade can swing in said plane relative to the rotatable member, and can be swung in said plane by rotation of the rotatable member, said switchblade being monolithic, unitary, continuous, and unjointed, and mounted to swing freely and without restraint or control between two angular positions; a contact member; a contact surface on said contact member which is spaced from the central axis by a distance not greater than the sum of the distance between the central axis and the said point, plus the distance between the said point and a contacting portion of the blade, whereby the blade and contact may be placed into abutting current-carrying relationship by turning the blade to an oblique angle relative to the straight line between the central axis and the point so as to reduce the distance between the central axis and the contacting portion of the blade, turning the rotatable member to move the said contacting portion toward the contact surface and continuing rotation of the rotatable member so that the blade turns around its contacting portion and the said line and the blade are aligned in one of the blade—'s said angular positions, the blade and the contact means being adapted for connection in a circuit which can be closed or opened by the isolator switch, the opening of the switch being accomplished by a reversal of said steps.

2. An isolator switch according to claim 1 in which the contact surface faces toward the said central axis to make a compressive abutment contact with the end of the switchblade.

3. An isolator switch according to claim 2 in which the contact surface is resiliently, springily mounted relative to the central axis.

4. An isolator switch according to claim 1 in which the contact surface faces laterally relative to the blade so as to make a sliding abutment contact therewith.

5. An isolator switch according to claim 4 in which the contact surface is resiliently springily mounted relative to the central axis.

6. An isolator switch according to claim 1 in which detent means is provided to restrain the blade in said angular positions around the said point.

7. An isolator switch according to claim 1 in which two of said blades are provided and in which means is provided for maintaining them in geometric parallelism.

8. An isolator switch according to claim 1 in which the contact surface is formed in a cavity, which cavity has an open end facing toward the central axis, and in which a bounding wall bounds at least a portion of the cavity so as to form a fully peripheral boundary to restrain the free end of the blade from motion out of the cavity in all lateral directions relative to the length of the blade.

9. An isolator switch according to claim 8 in which the bounding wall is provided with a slot for lateral entry of the free end into the cavity.

10. An isolator switch according to claim 9 in which the blade is biased toward an angular relationship relative to said line.

11. An isolator switch according to claim 1 in which the blade is biased toward an angular relationship relative to said line.

12. An isolator switch according to claim 1 in which the contact member is mounted to a column having a distortable element therein to permit deflection of the contact member in response to force exerted on the contact surface by the free end of the blade.

13. An isolator switch according to claim 12 in which said distortable element comprises a spring.

14. An isolator switch according to claim 13 in which the spring is disposed between the ends of the column.

15. A double isolator switch comprising: a rotatable member having a central axis of rotation; a pair of switchblades, each of said switchblades lying in a plane normal to said central axis and being rotatably mounted to said rotatable member at a respective point which is spaced laterally from said central axis, the axis and the two points lying in a common plane, with the points on opposite sides of the central axis from each other, whereby each of said blades can swing iS its respective plane relative to the rotatable member, and can be swung in said plane by rotation of the rotatable member, said switchblades being monolithic, unitary, continuous, and unjointed, and mounted to swing freely and without restraint or control between two angular positions; a pair of contact members, a contact surface on each of said contact members which is spaced from the central axis by a distance not greater than the sum of the distances between the central axis and the respective point plus the distance between the respective point and the contacting portion of the respective blade; a bounding wall on each said contact member forming a cavity which is open toward the central axis and exposes the contact surface to it, said bounding wall forming a full peripheral boundary in said cavity, the central axis and contact surfaces being aligned, with the contact members on opposite sides of the central axis, whereby the two sets of blades and contact members may be placed into abutting current-carrying relationship by turning the blades to an oblique angle relative to the straight line between the central axis and the point so as to reduce the distance between the central axis and the free end of the respective blade, turning the rotatable member to move the free ends into the cavities and against the respective contact surfaces, and with the free ends within the respective boundaries continuing the rotation of the rotatable member so that each blade turns around its free end and the said line and the blade are aligned, the bounding walls restraining respective free ends against lateral displacement from the respective cavities, the blades being conductively interconnected, and the contact members being adapted for connection in a circuit which can be closed and opened by the isolator switch, the opening of the switch being accomplished by a reversal of said steps.

16. An isolator switch according to claim 15 in which the blades are biased toward an angular relationship relative to said line.

17. An isolator switch according to claim 15 in which the bounding wall of each contact member is provided with a slot for lateral entry of the face end into the cavity.

18. An isolator switch according to claim 17 in which the blades are biased toward an angular relationship relative to said line.

19. An isolator switch according to claim 15 in which each contact member is mounted to a column having a distortable element therein to permit deflection of the contact member in response to force exerted on the contact member by the free end of the blade.

20. An isolator switch according to claim 19 in which said distortable element comprises a spring.

21. An isolator switch according to claim 20 in which the spring is disposed between the ends of the column.

22. A double isolator switch comprising: a rotatable member having a central axis of rotation; a pair of switchblades, each of said switchblades lying in a plane normal to said central axis and being rotatably mounted to said rotatable member at a respective point which is spaced laterally from said central axis, the axis and the two points lying in a plane that includes the central axis, with the points on opposite sides of the central axis from each other, whereby each of said blades can swing in its respective plane relative to the shaft, and can be swung in said plane by rotation of the rotatable member; a central gear fixed to the rotatable member; a freely rotating spider ring mounted to said rotatable member and journaling the blades through a pair of satellite gears to which the blades are fixed, the satellite gears engaging the central gear; a pair of contact members; a contact surface on each of said contact members which is spaced from the central axis by a distance not greater than the sum of the distances between the central axis and the respective point plus the distance between the respective point and the contacting portion of the respective blade; the central axis and contact surfaces being aligned with the contact members on opposite sides of the central axis whereby the two sets of blades and contact members may be placed into abutting current-carrying relationship by turning the blades to an oblique angle relative to the straight line between the central axis and the point so as to reduce the distance between the central axis and the free end of the respective blade, turning the rotatable member to move the free ends toward and into contact with the respective contact surface, and continuing to turn the rotatable member so that each blade turns around its free end until the said line and the blade are aligned, the blades being conductively interconnected, and the contact members being adapted for connection in a circuit which can be closed and opened by the isolator switch, the opening of the switch being accomplished by a reversal of said steps, the gears maintaining the blades in parallelism.

23. A double isolator switch comprising: a rotatable member having a central axis of rotation; a pair of switchblades, each of said switchblades lying in a plane normal to said central axis and being rotatable mounted to said rotatable member at a respective point which is spaced laterally from said central axis, the axis and the two points lying in a plane that includes the central axis, with the points on opposite sides of the central axis from each other, whereby each of said blades can swing in its respective plane relative to the shaft, and can be swung in said plane by rotation of the rotatable member; a central gear on said central axis, mounted to the rotatable member for free rotation relative thereto; a pair of satellite gears mounted to the rotatable member for free rotation relative thereto to which satellite gear the blades are fixed, the satellite gears engaging the central gear; a pair of contact members; a contact surface on each of said contact members which is spaced from the central axis by a distance not greater than the sum of the distances between the central axis and the respective point plus the distance between the respective point and the contacting portion of the respective blade; the central axis and contact surfaces being aligned with the contact members on opposite sides of the central axis whereby the two sets of blades and contact members may be placed into abutting current-carrying relationship by turning the blades to an oblique angle relative to the straight line between the central axis and the point so as to reduce the distance between the central axis and the free end of the respective blade, turning the rotatable member to move the free ends toward and into contact with the respective contact surface, and continuing to turn the rotatable member so that each blade turns around its free end until the said line and the blade are aligned, the blades being conductively interconnected, and the contact members being adapted for connection in a circuit which can be closed and opened by the isolator switch, the opening of the switch being accomplished by a reversal of said steps, the gears maintaining the blades in parallelism.

UNITED STATES PATENT OFFICE
CERTIFICATE OF CORRECTION

Patent No. 3,598,940　　　　　　　　Dated August 10, 1971

Inventor(s) Anderson B. Smedley and Paul A. Smedley

It is certified that error appears in the above-identified patent and that said Letters Patent are hereby corrected as shown below:

Col. 1, line 23,　　after "be" insert --made--

Col. 7, line 24,　　"blade_'s" should be --blade's--
Claim 1, line 24)

Col. 8, line 4,　　"i5" should be --in--
Claim 15, line 8)

Signed and sealed this 9th day of January 1973.

(SEAL)
Attest:

EDWARD M. FLETCHER, JR.　　　　　　　ROBERT GOTTSCHALK
Attesting Officer　　　　　　　　　　　Commissioner of Patents